United States Patent
deVos et al.

(10) Patent No.: US 7,489,859 B2
(45) Date of Patent: Feb. 10, 2009

(54) FUEL STORAGE DEVICES AND APPARATUS INCLUDING THE SAME

(75) Inventors: John A deVos, Corvallis, OR (US);
James E. Clark, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 10/683,150

(22) Filed: Oct. 9, 2003

(65) Prior Publication Data

US 2005/0079128 A1     Apr. 14, 2005

(51) Int. Cl.
*A47J 27/00*     (2006.01)
(52) U.S. Cl. ........................... 392/441; 392/445
(58) Field of Classification Search ............ None
See application file for complete search history.

(56) References Cited

U.S. PATENT DOCUMENTS

| | | | |
|---|---|---|---|
| 1,416,938 A | 5/1922 | Bowman | |
| 3,450,500 A | 6/1969 | Setzer et al. | |
| 4,193,978 A | 3/1980 | Muller et al. | |
| 4,354,822 A | 10/1982 | Madsen et al. | |
| 4,493,878 A | 1/1985 | Horiba et al. | |
| 4,807,584 A * | 2/1989 | Davis | 123/557 |
| 4,866,250 A | 9/1989 | Pasbrig | |
| 5,432,023 A | 7/1995 | Yamada et al. | |
| 5,504,471 A | 4/1996 | Lund | |
| 5,644,342 A | 7/1997 | Argyres | |
| 5,673,939 A | 10/1997 | Bees et al. | |
| 5,789,093 A | 8/1998 | Malhi | |
| 5,797,269 A | 8/1998 | Nishimura et al. | |
| 5,812,156 A | 9/1998 | Bullock et al. | |
| 5,939,033 A | 8/1999 | Kendall et al. | |
| 5,962,155 A | 10/1999 | Kuranaka et al. | |
| 5,976,725 A | 11/1999 | Gamo et al. | |
| 6,007,186 A | 12/1999 | Erni | |
| 6,015,209 A | 1/2000 | Barinaga et al. | |
| 6,039,430 A | 3/2000 | Helterline et al. | |
| 6,054,228 A | 4/2000 | Cisar et al. | |
| 6,057,051 A | 5/2000 | Uchida et al. | |
| 6,089,687 A | 7/2000 | Helterline | |
| 6,113,208 A | 9/2000 | Benjamin et al. | |
| 6,129,861 A | 10/2000 | Meusinger et al. | |
| 6,198,250 B1 | 3/2001 | Gartstein et al. | |
| 6,268,077 B1 | 7/2001 | Kelly et al. | |
| 6,294,276 B1 | 9/2001 | Ogino | |
| 6,530,233 B1 | 3/2003 | Nakamura et al. | |
| 6,534,033 B1 | 3/2003 | Amendola | |
| 6,713,201 B2 | 3/2004 | Bullock et al. | |
| 6,724,194 B1 | 4/2004 | Barton | |
| 6,828,049 B2 | 12/2004 | Bullock et al. | |
| 6,887,596 B2 | 5/2005 | Leban | |
| 2001/0045364 A1 | 11/2001 | Hockaday et al. | |
| 2001/0052433 A1 | 12/2001 | Harris et al. | |
| 2002/0018925 A1 | 2/2002 | Merin Celemin et al. | |
| 2002/0127447 A1 | 9/2002 | Edlund et al. | |

(Continued)

FOREIGN PATENT DOCUMENTS

EP     0 940 260     9/1999

(Continued)

*Primary Examiner*—Thor S Campbell (57) ABSTRACT

A fuel storage device in accordance with a present invention includes a fuel storage area and at least one of a fuel heater, a byproduct heater and a valve.

9 Claims, 6 Drawing Sheets

U.S. PATENT DOCUMENTS

| | | |
|---|---|---|
| 2003/0008186 A1 | 1/2003 | Dickman et al. |
| 2003/0022041 A1 | 1/2003 | Barton et al. |
| 2003/0022042 A1 | 1/2003 | Wells et al. |
| 2003/0051785 A1 | 3/2003 | Gauthier et al. |
| 2003/0082426 A1 | 5/2003 | Bullock et al. |
| 2003/0082427 A1 | 5/2003 | Prasad et al. |
| 2003/0124408 A1 | 7/2003 | Hojo et al. |
| 2003/0129464 A1 | 7/2003 | Becerra et al. |
| 2003/0136453 A1 | 7/2003 | Johnson |
| 2003/0138676 A1 | 7/2003 | Leban |
| 2003/0138679 A1 | 7/2003 | Prasad et al. |
| 2004/0009121 A1 | 1/2004 | Jensen et al. |
| 2004/0076861 A1 | 4/2004 | Mann et al. |

FOREIGN PATENT DOCUMENTS

| | | |
|---|---|---|
| EP | 1 253 522 | 10/2002 |
| EP | 1 353 393 | 10/2002 |
| EP | 1 306 918 | 5/2003 |
| EP | 1396472 A2 | 3/2004 |
| GB | 1568374 A | 5/1980 |
| GB | 2283235 A | 5/1995 |
| JP | 09-213359 A | 8/1997 |
| JP | 10-321248 A | 12/1998 |
| JP | 2001-185184 A | 7/2001 |
| JP | 2001-295996 A | 10/2001 |
| JP | 2001-313047 A | 11/2001 |
| WO | WO-98/20282 A1 | 5/1998 |
| WO | WO-00/24076 A | 10/1998 |
| WO | WO 00/35032 | 6/2000 |
| WO | WO01/79012 | 10/2001 |
| WO | WO03/043112 | 5/2003 |
| WO | WO-2004/001883 A2 | 12/2003 |

* cited by examiner

FUEL STORAGE DEVICES AND APPARATUS INCLUDING THE SAME

BACKGROUND OF THE INVENTIONS

1. Field of the Inventions

The present inventions are related to fuel storage devices that may be used, for example, in combination with fuel cells.

2. Background

Many devices are fueled by fuel that is stored in a fuel cartridge or other fuel storage device. Although the present inventions are not limited to fuel storage devices that are used in conjunction with any particular type of fuel consuming device, fuel cells are one example of a device that may consume fuel stored in a fuel storage device, and the present inventions are discussed in the context of fuel cells for illustrative purposes only. Fuel cells convert fuel and oxidant into electricity and a reaction product. Fuel cells that employ hydrogen as the fuel and oxygen as the oxidant, for example, produce water and/or water vapor as the reaction product.

The inventors herein have determined that conventional fuel storage devices, especially those used in conjunction with fuel cells, are susceptible to improvement. More specifically, the inventors herein have determined that it would be desirable to provide fuel storage devices that can precisely control the flow of fuel to the fuel cell. The inventors herein have also determined that it would be desirable to provide fuel storage devices that are capable of preheating the fuel and heating byproduct that enters the storage device.

BRIEF DESCRIPTION OF THE DRAWINGS

Detailed description of embodiments of the inventions will be made with reference to the accompanying drawings.

DETAILED DESCRIPTION OF THE ILLUSTRATED EMBODIMENTS

The following is a detailed description of the best presently known modes of carrying out the inventions. This description is not to be taken in a limiting sense, but is made merely for the purpose of illustrating the general principles of the inventions. Additionally, although the inventions herein are discussed in the context of fuel cells and host devices powered by fuel cells, the fuel cartridges described herein are not limited solely to use with fuel cells. With respect to fuel cells, the present inventions are applicable to a wide range of fuel cell technologies, including those presently being developed or yet to be developed. Thus, although various exemplary fuel cartridges are described below with reference to direct methanol fuel cells, other types of fuel cells, such as solid oxide fuel cells and hydrogen fuel cells, are equally applicable to the present inventions. It should also be noted that detailed discussions of fuel cell structures, the structures of other fuel consuming devices, and the internal operating components of host devices powered thereby that are not pertinent to the present inventions have been omitted for the sake of simplicity.

As illustrated for example in FIGS. 1-6, a fuel cartridge 100 in accordance with one embodiment of a present invention includes a housing 102, a fuel storage area 104 and a byproduct storage area 106. Fuel F exits the fuel cartridge 100 by way of a connector 108 and byproduct B enters the cartridge by way of a connector 110. It should be noted that, as used herein, the word "byproduct" is used to refer to the byproduct of the fuel cell reaction and, in some instances, any unused reactants that may require storage. The connectors 108 and 110, which mate with corresponding connectors 109 and 111 (FIGS. 5, 6 and 8) that are associated with the host device or fuel cell (or other fuel consuming device), also act as caps to prevent fuel, byproducts or other materials from exiting or entering the housing 102 unless the connectors have mated in the manner described below. The exemplary cartridge 100 is also provided with a fuel heater 112 that heats the fuel F as it exits the fuel cartridge. The fuel heater 112 in the exemplary embodiment is a heat exchanger that receives heat H from the associated fuel cell (or other fuel consuming device) by way of a connector 114 and transfers the heat to the fuel F in the manner described below with reference with FIG. 4.

Figure 1:
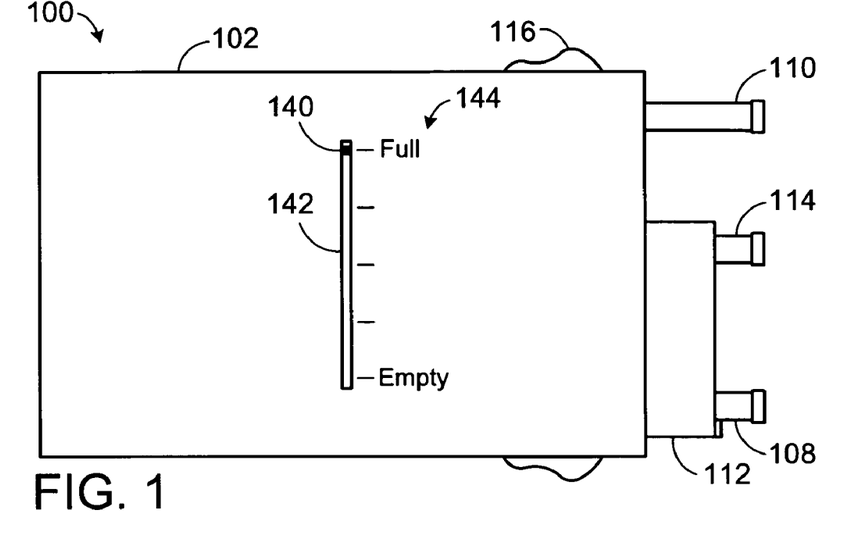
FIG. 1 is a plan view of a fuel cartridge in accordance with an embodiment of a present invention.

The exemplary fuel cartridge 100 and the portion of the host device that receives the fuel cartridge may have corresponding shapes and a mechanical keying apparatus (not shown), such as a rail and slot arrangement, to prevent the fuel cartridge from being inserted improperly and, in many instances, prevent the wrong type of fuel cartridge from being connected to the host device. A suitable locking device, such as springs (not shown) that engage the exemplary retention elements 116, may also be provided to hold the fuel cartridge 100 in place. Additionally, a relatively small fuel cartridge 100 (as compared to the host device) could be inserted into the host device, while relatively large fuel cartridges could be mounted on the exterior.

The volume of fuel storage area 104 may be initially maximized and the volume of the byproduct storage area 106 may be initially minimized so that the amount of fuel stored in the cartridge 100 may be maximized for a given housing size. As the fuel is transferred to and consumed by the associated fuel cell, the volume of the storage area 104 decreases. The volume of the byproduct storage area 106 increases in order to accommodate the byproduct from the reaction at the fuel cell. The overall volume of the housing 102 should be sufficient to hold a full volume of fuel prior to use, the combined volumes of the fuel and byproduct as the fuel is being consumed, and a full volume of byproduct after the fuel has been completely consumed. As such, the overall volume of the housing 102 will depend primarily on the fuel consumed by the fuel cell and the associated fuel/byproduct ratio. The specific type of fuel will, of course, depend on the fuel cell being fueled. Although the present inventions are not limited to any particular fuels or fuel cells, suitable fuels include, for example, methanol for a direct methanol fuel cell, butane or other hydrocarbons for a solid oxide fuel cell, and borohydride for a hydrogen fuel cell. The fuel may also be stored within the housing 102 in a liquid state or a gaseous state.

In the exemplary implementation illustrated in FIGS. 1-6, the fuel storage area 104 is defined by a flexible fuel container 118, while the byproduct storage area 106 is defined by a flexible byproduct container 120. An outlet tube 122, which is connected to the connector 108 by way of the fuel heater 112, extends into the flexible fuel container 118 so that fuel within the fuel storage area 104 can flow out of the exemplary cartridge 100. Similarly, a portion of connector 110 extends into the flexible byproduct container 120 so that byproduct can flow into the byproduct storage area 106. Alternatively, a single flexible container that is divided into separate fuel and byproduct volumes by a movable wall located within the container may be employed. As illustrated for example in FIGS. 2 and 3, the flexible containers 118 and 120 should each have a large enough maximum volume to occupy perhaps all of the interior of the housing 102 and, when emptied, occupy only a small portion of the housing interior. This allows the flexible containers 118 and 120, either individually or in combination, to occupy as much as the entire interior of the housing over the life of the cartridge 100.

Figure 4:
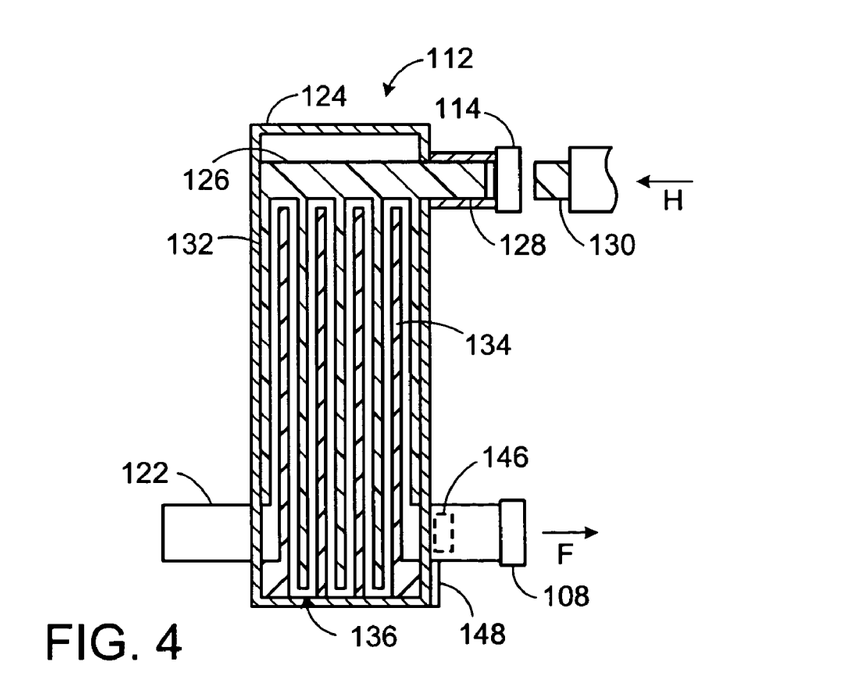
FIG. 4 is a plan, partial section view of a heat exchanger in accordance with an embodiment of a present invention.

Referring to FIG. 4, and as noted above, the fuel heater 112 transfers heat received from the associated fuel cell (or other fuel consuming device) to the fuel as it exits the exemplary cartridge 100. More specifically, the fuel heater 112 in the exemplary embodiment has an inlet that is connected to the fuel container 118 and an outlet that is connected to the connector 108. The exemplary fuel heater 112 is a heat exchanger that includes a housing 124 and a heat pipe 126. The heat pipe 126, which in the illustrated embodiment is a solid aluminum rod, includes a portion 128 that extends at least partially through the connector 114. Heat pipe portion 128 may be brought into thermal contact (and, in the illustrated embodiment, physical contact) with a corresponding heat pipe 130 that extends from the associated fuel cell. The heat pipe 130 may be heated at the fuel cell by, for example, bringing the heat pipe into thermal contact with heat sink fins that extend from the fuel cell electrodes. The heat pipe 126 (and/or heat pipe 130) may, alternatively, be any other device that is capable of transferring heat from the fuel cell to the fuel heater 112. A plurality of heat transfer fins 132 are connected to the heat pipe 126 and a plurality of walls 134 are positioned between the heat transfer fins. The inner surface of the housing 124, the heat transfer fins 132 and the walls 134 together define a fuel path 136. Fuel from the fuel storage area 104 is heated by the heat pipe 126 and fins 132 as the fuel travels through the fuel path 136 on its way to the connector 108. Portions of the heat pipe 126, heat pipe 130 and/or heat transfer fins 132 that may come into contact with fuel can be coated with plastic or other non-reactive material to prevent corrosion and premature fuel reaction with the metal surfaces.

There are a number of advantages associated with the aforementioned fuel heater. For example, preheating the fuel may increase the overall efficiency of the system. The present fuel heater also eliminates the need for external fuel heaters (i.e. fuel heaters that are associated with the fuel cell or host device).

Figure 10:
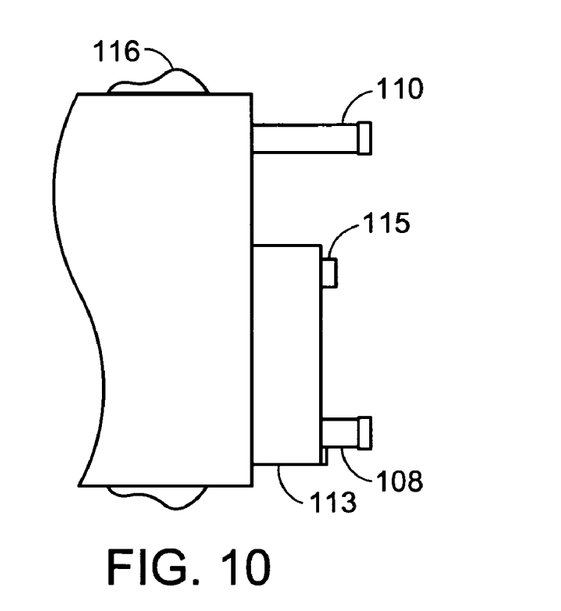
FIG. 10 is a partial plan view of a fuel cartridge in accordance with an embodiment of a present invention.

Other types of fuel heating arrangements may also be employed. By way of example, but not limitation, heated byproduct from the associated fuel cell may be run through a heat exchanger to provide heat for the fuel prior to entering the byproduct storage area 106. Such a fuel heater may be used instead of, or in combination with, the exemplary fuel heater 112. Turning to FIG. 10, a resistive fuel heater 113 may also be employed. The exemplary resistive fuel heater 113 may be powered by a battery that is associated with the fuel cell or host device (typically during fuel cell startup) and, to that end, an electrical connector 115 is provided. Alternatively, the resistive fuel heater 113 may be powered by the fuel cell itself. In either case, the resistive heater may also be used post-startup to heat fuel as it exits the fuel cell in the manner described above.

The exemplary fuel cartridge 100 is also provided with a pressurizer to increase the pressure within fuel storage area 104. The pressure may be raised to a level that causes fuel to flow to the fuel cell, thereby eliminating the need for a fuel pump in the fuel cell or host device. The required fuel flow is typically proportional to the electrical current being consumed by the device the fuel cell is intended to run. Any suitable mechanism may be used to pressurize fuel storage area 104. In the embodiment illustrated in FIGS. 1-6, the pressurizer is in the form of a spring 138 (note FIGS. 2 and 3) that drives fuel from the fuel storage area 104. Although the spring 138 is a bow spring that provides a substantially constant force, any suitable spring may be employed.

The spring 138 (or other pressurizer) may be positioned at any suitable location within housing 102. In the illustrated embodiment, the spring 138 is positioned within the flexible byproduct container 120 and pushes against the inner surface 120a thereof. Positioning the spring 138 in this manner causes an increase in pressure within the fuel storage area 104, and a decrease in pressure within the byproduct storage area 106, as compared to what it would be without the spring. Increasing pressure within the fuel storage area 104, as noted above, drives fuel through fuel heater 112 and out of the cartridge 100. Decreasing the pressure within the byproduct storage area 106 helps draw byproduct into the cartridge 100 and helps prevent byproduct from leaking out of byproduct storage area 106 by creating backpressure across the connector 110. Typically, there is a one-to-one correspondence between the decrease in volume of the fuel storage area 104 and the increase in volume of the byproduct storage area 106.

A movable wall 140 is positioned between the fuel and byproduct containers 118 and 120 in the illustrated embodiment. The movable wall 140 is generally rigid and acts as a pressure distribution mechanism that distributes the spring force evenly across the associated wall of the flexible fuel container 118. Although the movable wall 140 may be any suitable size, the exemplary movable wall is large enough to distribute the force generated by the spring 138 evenly across the entire side of the flexible fuel container 118. As illustrated for example in FIG. 2, the spring 138 is in a compressed state when the fuel storage area 104 is full. As fuel exits the flexible fuel container 118, the spring 138 expands, thereby driving the wall 140 through the fuel storage area 104. This decreases the volume of fuel storage area 104 and increases the volume of the byproduct storage area 106. The spring 138 is in a more extended state, as illustrated for example in FIG. 3, when the fuel container 118 is empty.

It should be noted that the present inventions are not limited to such an arrangement. For example, the movable wall may be omitted depending on the pressurizer scheme. The movable wall 140 may also be replaced with a pair of generally rigid plates positioned within the flexible inner container 120 on opposite sides of the spring 138. The plates may be attached to the spring 138, to the interior walls of the flexible inner container 120, or may float freely between the spring and the walls. Additional details concerning the flexible fuel containers 118 and 120, the spring 138, and the movable wall 140 are provided in U.S. application Ser. No. 10/000,249 (Pub. No. US 2003/0082427 A1), which is assigned to the Hewlett-Packard Company The movable wall 140 may also be used in a fuel level indicator arrangement to allow the user to determine how much fuel is in the fuel cartridge 100. Referring to FIG. 1, the housing 102 may be provided with a window 142 through which a small portion of the movable wall 140 is visible. The housing 102 also includes indicia 144 that is located at positions which correspond to the position that the movable wall 140 is in at various times during the useful life of the cartridge 100. For example, when the fuel storage area 104 is full (FIG. 2), the movable wall 140 is aligned with the "Full" indicia and when the fuel storage area is empty (FIG. 3), the movable wall is aligned with the "Empty" indicia.

The exemplary fuel cartridge 100 also includes a metering device for precisely controlling the flow of pressurized fuel through the connector 108. As illustrated in FIG. 4, the exemplary fuel cartridge 100 includes a valve 146 that is located between the connector 108 and the downstream end of the fuel path 136. The valve 146, which can be any suitable device that is capable of controlling the flow of fuel, is operable between a fully open state which allows maximum fuel flow, a fully closed state that allows no fuel flow, and a plurality of states therebetween that allow the fuel to flow at various rates between no flow and full flow in the illustrated embodiment. The exemplary valve 146 is controlled with electrical signals that are received by an electrical connector 148 on the exterior of the housing 102. The host device may include a corresponding electrical connector 149 (FIG. 8) that allows valve control signals from the host device to be transmitted to the valve 146. The valve 146 may, alternatively, be configured to be controlled by a mechanical device. Here, the electrical coupling may be replaced by a mechanical coupling. The host device typically controls the valve 146 based on the level of the electrical load. Alternatively, valve control may be based on fuel pressure measured at the fuel cell or other types of performance based feedback. Valve control may also be accomplished by a controller that is carried by the fuel cartridge itself.

A wide variety of electrical, mechanical and electromechanical valves may be used to meter the fuel. Such valves include, but are not limited to, diaphragm valves, solenoid valves, bimetallic strip valves, positive pressure valves, umbrella valves, poppet valves and duckbill valves.

The location of the valve or other metering device may also be varied, so long as it is an integral part of the overall fuel cartridge. For example, the metering device may be located within the outlet tube 122 or at some other position upstream of the heater 112. In those instances where a heater is omitted from the fuel cartridge, the metering device may be located within the housing or within the connector 108 near the inlet end.

Although the present inventions are not limited to any particular arrangement for the connection of the fuel cartridge to the host device, the exemplary arrangement is a self-sealing connector arrangement that prevents leakage. With such a self-sealing arrangement, seals are maintained at the fuel cartridge 100 and the host device when the two are connected to, and disconnected from, one another as the fuel cartridge is received by, and removed from, the host device. Once the sealed connection is made, fuel is allowed to flow from the fuel storage area 104 to the fuel cell or other fuel consuming device, and byproduct is allowed to flow into the byproduct storage area 106, under the conditions described below. The connection may occur automatically when the fuel cartridge 100 is received by (e.g. inserted into or connected to) the host device to connect the fuel cartridge to the associated fuel consuming device.

Figure 5:
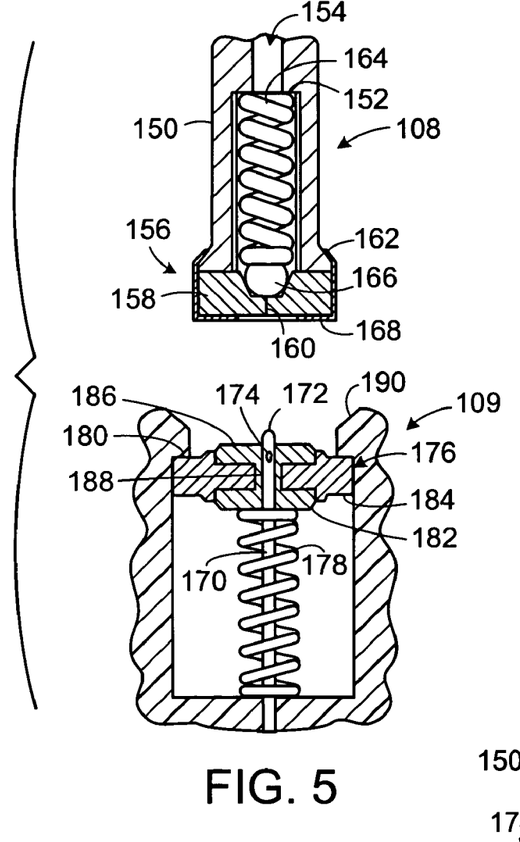
FIG. 5 is a partial section view of a connector arrangement in accordance with an embodiment of a present invention in a disconnected state.
Figure 6:
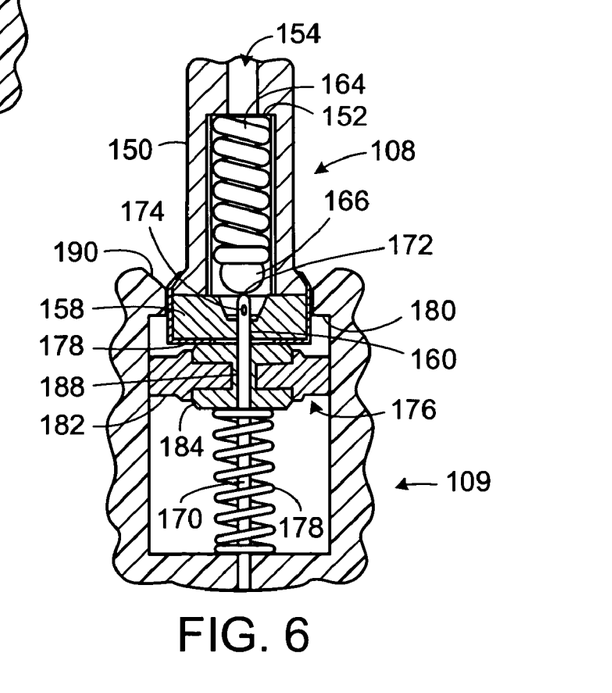
FIG. 6 is a partial section view of the connector arrangement illustrated in FIG. 5 in a connected state.

One example of a self-sealing connector arrangement that may be used in conjunction with the present inventions is illustrated in FIGS. 5 and 6. The arrangement includes the aforementioned fuel connector 108 and host device connector 109. The byproduct connector 110 and corresponding host device connector 111 (FIG. 8) have the same configuration in the illustrated embodiment. Additionally, instead of connecting the fuel cartridge to the host device, the fuel cell or other fuel consuming device may be provided with its own connectors so that the fuel cartridge can be connected directly thereto.

The exemplary connector 108 includes a hollow cylindrical boss 150 having an inwardly projecting edge 152 and lumen 154 that opens into the fuel heater 112. The end 156 includes a compliant septum 158 with a slit 160 that is secured by a crimp cap 162. A spring 164 (or other biasing device) and a sealing ball 166 are positioned between the compliant septum 158 and the inwardly projecting edge 152. The length of the spring 164 is such that the spring biases the sealing ball 166 against the septum 158 to form a seal. The end 168 of the crimp cap 162 includes an opening that is aligned with the septum slit 160.

The exemplary host device connector 109 includes a needle 170 having a closed end 172, a lateral hole 174, and a bore that extends from the lateral hole axially through the needle. A sliding collar 176, which surrounds the needle 170 and is biased by a spring 178 (or other biasing device) against an annular stop 180, includes a compliant sealing portion 182 and a substantially rigid retaining portion 184. The compliant sealing portion 182 includes an exposed upper surface 186 and an inner surface 188 in contact with the needle 170. In the disconnected position illustrated in FIG. 5, the hole 174 is surrounded and sealed by the sealing portion inner surface 188. The host device connector 109 may also be provided with a tapered lead-in portion 190 that guides and centers the fuel cartridge connector 108 as it moves into the connected position illustrated in FIG. 6.

When the fuel cartridge connector 108 is inserted into the host device connector 109 (FIG. 6) in order to establish a connection between the fuel cartridge 100 and the host device, the closed end 172 of the needle 170 will pass through the septum slit 160. The septum 158 should be compliant enough to allow the needle 170 to be inserted without large insertion forces. As the needle 170 passes through the septum 158 into the cylindrical boss 150, the septum surface 186 seals against the crimp cap surface 168 prior to the ball being dislodged. The sliding collar 176 and sealing ball 166 will be urged in opposite directions until the hole 174 is exposed. This establishes communication between the fuel cartridge 100 and the host device. Additional details concerning the exemplary connector arrangement illustrated in FIGS. 5 and 6 may be found in U.S. Pat. No. 6,015,209, which is assigned to the Hewlett-Packard Company.

Turning to materials, and although the exemplary housing 102 may be formed from any suitable material, the choice of materials will typically depend on the environment that will surround the housing. The exemplary housing illustrated in FIGS. 1-6 includes the flexible containers 118 and 120 and, accordingly, does not need to be formed from a material with any particular resistance to the fuel and byproduct (though it may still be desirable to use chemically resistant materials to contain a leak more effectively). Suitable materials include, for example, polyethylene, polypropylene, polyethylene terephthalate, polystyrene blends and copolymers, PEEK, polysulfone, and polymer blends and copolymers of these materials. It should be noted that in some implementations, the housing 102 will not be an enclosed container-like structure and will instead be an open structure that merely defines a space for fuel and waste storage.

With respect to the construction of the flexible containers 118 and 120, the containers may be formed from a single-layered structure or a multi-layered structure, rather than from a single-layered structure. For example, a three-layer structure composed of a high-gas barrier layer sandwiched between two chemically inert outer layers may be employed. Each of these layers may be made of any suitable materials. The middle layer may, for example, be formed from a liquid crystal polymer or a polyamide, which has an extremely low permeability to gasses, and the outer layers may be formed from a suitable polymer, such as polyethylene, polypropylene, polystyrene blends or copolymers, PEEK, polysulfone, and polymer blends and copolymers of these materials. Alternatively, a metallic outer layer may be added to provide an additional gas barrier layer and to improve heat transfer between byproduct storage area 106 and the fuel storage area 104. Another alternative is a five-layered structure including an inner polymer layer sandwiched between two metallic layers that are each covered with a bonding layer that allows the material to be bonded to itself to form a container. The bonding layer may be formed from polyethylene or any other suitable material that may be bonded to itself.

The flexible byproduct container 120 may include a super-absorbent material to prevent the byproduct leakage should the container rupture or the connector 110 fail. The super-absorbent material in the exemplary embodiment is a material that is very thin when dry, but can expand to absorb a volume of a fluid many times greater than the initial volume of the material. Examples of suitable super-absorbent materials include cross-linked polyacrylic acid salts, polyvinyl alcohol, poly(2-hydroxyethyl methacrylate)/poly(ethylene oxide), isobutylene-maleic acid copolymer derivatives, poly(methacrylic acid) salts, poly(acrylamide) and polyvinylpyrrolidone. Super-absorbent material may also be placed at any other desired location within the housing 102 to absorb fuel or byproduct in the event of a fuel or byproduct container rupture. Also, in addition to super-absorbent materials, materials such as cellulose sponge materials and standard foams that are merely absorbent may also be used.

The internal volume of the housing 102 will, of course, depend upon the intended application. In a fuel cell powered notebook computer, incorporating one embodiment of the described invention, the internal volume of the housing 102 will typically be 250 cc or less. In other applications, such storage devices that store fuel for portable power supply devices that are powered by fuel cells, the internal volume of the housing may be 1 L or more.

Figure 7:
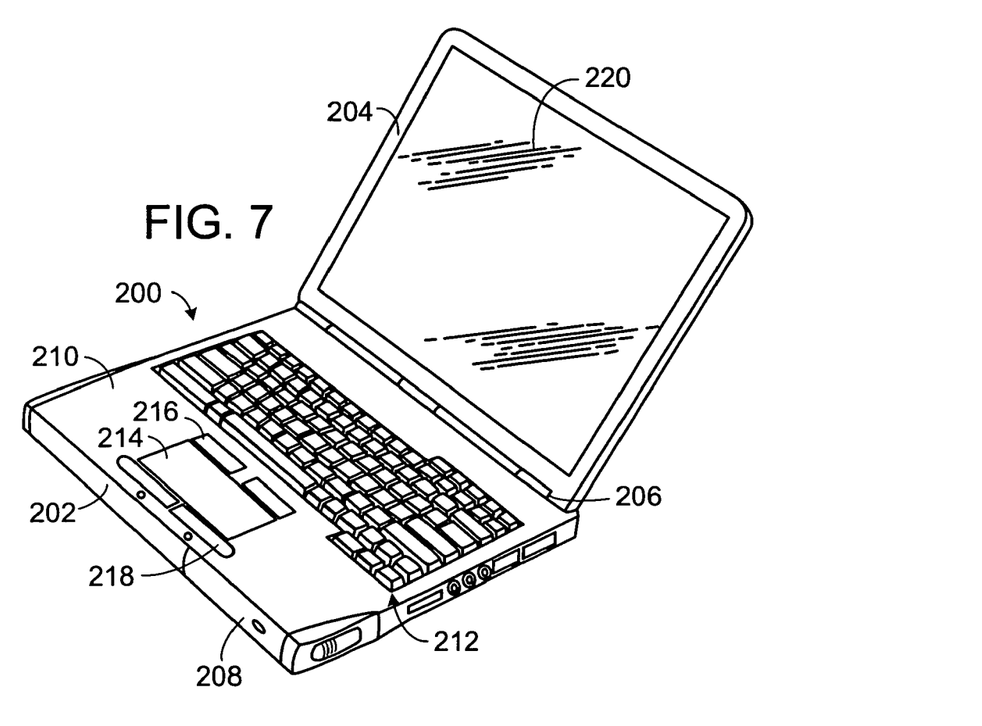
FIG. 7 is a perspective view of a notebook computer in accordance with an embodiment of a present invention.
Figure 8:
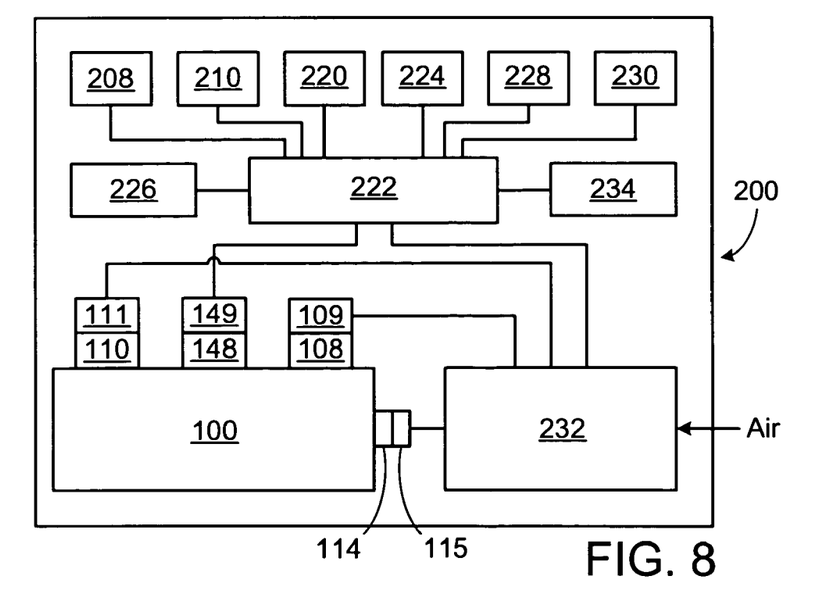
FIG. 8 is a schematic block diagram of a notebook computer and fuel cartridge in accordance with an embodiment of a present invention.

Although the present inventions are not limited to use with any particular host device, the fuel cell powered notebook computer 200 illustrated in FIGS. 7 and 8 is one example of a host device having elements that consume electrical power, as well as a device that generates the electrical power, which may be fueled by the fuel cartridges described above. Other exemplary host devices include, but are not limited to, personal digital assistants, digital cameras, portable telephones and games. The present fuel cartridges may also be used in conjunction with stand alone power generators, such as the electrochemical cell described below with reference to FIG. 9, that may be connected to separate power consuming devices in order to provide power thereto.

The exemplary notebook computer 200 is, with respect to many of the structural and operating components, substantially similar to conventional portable computers such as the Hewlett-Packard Omnibook 6000 notebook PC. More specifically, the exemplary portable computer 200 includes structural components such as a main housing 202 and a display housing 204 that is pivotably connected to the main housing by a hinge 206. The main housing 202 includes a module bay for optional modules such as the illustrated CD-ROM drive module 208, a 3.5 inch disk drive module, or a ZIP drive module. The exemplary main housing 202 is also provided with a user interface 210 that allows the user to interact with the computer 200. The user interface 210 includes a keyboard 212, a touch pad 214, a first pair of right/left click buttons 216 and a second pair of right/left click buttons 218. Each of these elements operates in conventional fashion to control the operations of the computer 200 and application programs running thereon. In addition to supporting a display 220, the display housing 204 also acts as a lid to cover the user interface 210 when in the closed position. To that end, a conventional latch arrangement (not shown) may be provided to lock the free end of the display housing 204 to the main housing 202 and maintain the display housing in the closed position.

The operating components of the exemplary computer 200 illustrated in FIGS. 7 and 8 include a CPU (or "processor") 222, cache and RAM memory 224, a power adapter and fan arrangement 226, a hard disk drive 228 and a modem 230. The exemplary portable computer 200 may also include other conventional components such as, for example, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The exemplary notebook computer 200 also includes a fuel cell system 232, or other fuel consuming/power generating device, that is connected to various electrical loads within the computer. The exemplary fuel cell system 232 is a fuel cell stack consisting of a plurality of cells as well as fuel, oxidant and byproduct manifolds. Although the present inventions are not limited to any particular type of fuel cell system, the exemplary fuel cells are direct methanol fuel cells. Fuel from the cartridge 100 is supplied to the anode and oxygen supplied to the cathode. In the illustrated embodiment, oxygen may be supplied to the fuel cell stack by drawing ambient air into the stack through a vent in the housing 202. A fan may be provided to facilitate this process. The byproducts of the fuel reaction (including water and $CO_2$, in the case of direct methanol) are carried away from the fuel cell and directed to the byproduct outlet connector 111. The notebook computer 200 or other host device should also include a battery 234 to provide power prior to the initial transfer of fuel to the fuel cell system 232. Such power would be used to, for example, power the system processor prior to the production of power by the fuel cell system 232. During operation of the exemplary computer 200, the CPU 222 will control the valve 146 (by way of the connectors 148 and 149) so that the proper amount of fuel will flow from the exemplary fuel cartridge 100 to the fuel cell system 232.

The present inventions also have application in the area of electrochemical cell devices, such as fuel cells and batteries, which may be used to power devices that consume electrical power (e.g. notebook computers, personal digital assistants, digital cameras, portable telephones and games). As illustrated for example in FIG. 9, an electrochemical cell device 300 in accordance with one embodiment of a present invention includes a housing 302, a fuel cartridge 100', an electrochemical cell stack 304 which receives fuel from the fuel cartridge and oxygen from ambient air that enters the housing by way of a vent, and a pair of contacts 306 and 308 that connect the stack to the host device. The electrochemical cell stack 304, which may be any suitable stack, will typically include a plurality of fuel cells as well as fuel, oxidant and byproduct manifolds. The fuel cartridge 100' is substantially similar to the cartridge 100 described above. For example, the fuel cartridge 100' includes a pressurized fuel supply, a valve to control the flow of fuel from the cartridge, byproduct storage, and a fuel heater.

Figure 9:
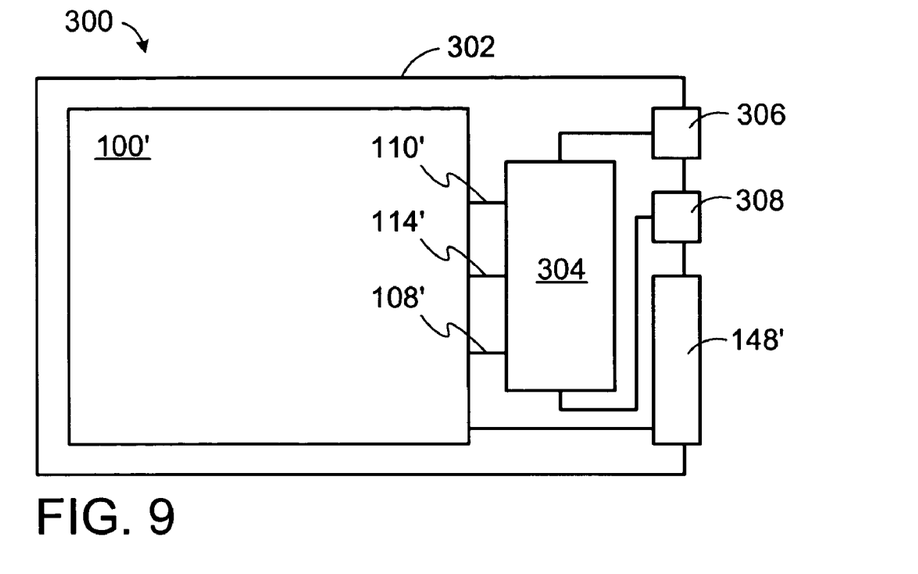
FIG. 9 is a schematic block diagram of an electrochemical cell device in accordance with an embodiment of a present invention.

The cartridge 100' is connected to the stack manifolds by way of a fuel line 108', a byproduct line 110', and a heat connection 114'. A valve control contact 148' is also provided so that the host device can control the fuel cartridge valve. The fuel cartridge 100' may also be either removable or permanently positioned within the housing 302. In those instances where it is removable, the fuel cartridge 100' and electrochemical cell stack 304 may be respectively provided with mating connectors, such as the fuel, byproduct and heat connection apparatus described above with respect to FIG. 24. It should be noted here that the primary difference between fuel cells and batteries is simply that all of the fuel that will be consumed by a battery is initially present in the battery, whereas fuel cells typically have a replenishable fuel supply. Thus, the exemplary electrochemical cell device 300 could also be referred to as a "fuel cell" in those instances where the associated fuel cartridge 100' is replaceable, or as a "battery" in those instances where the associated fuel cartridge 100' is not replaceable.

Figures 11, 12:
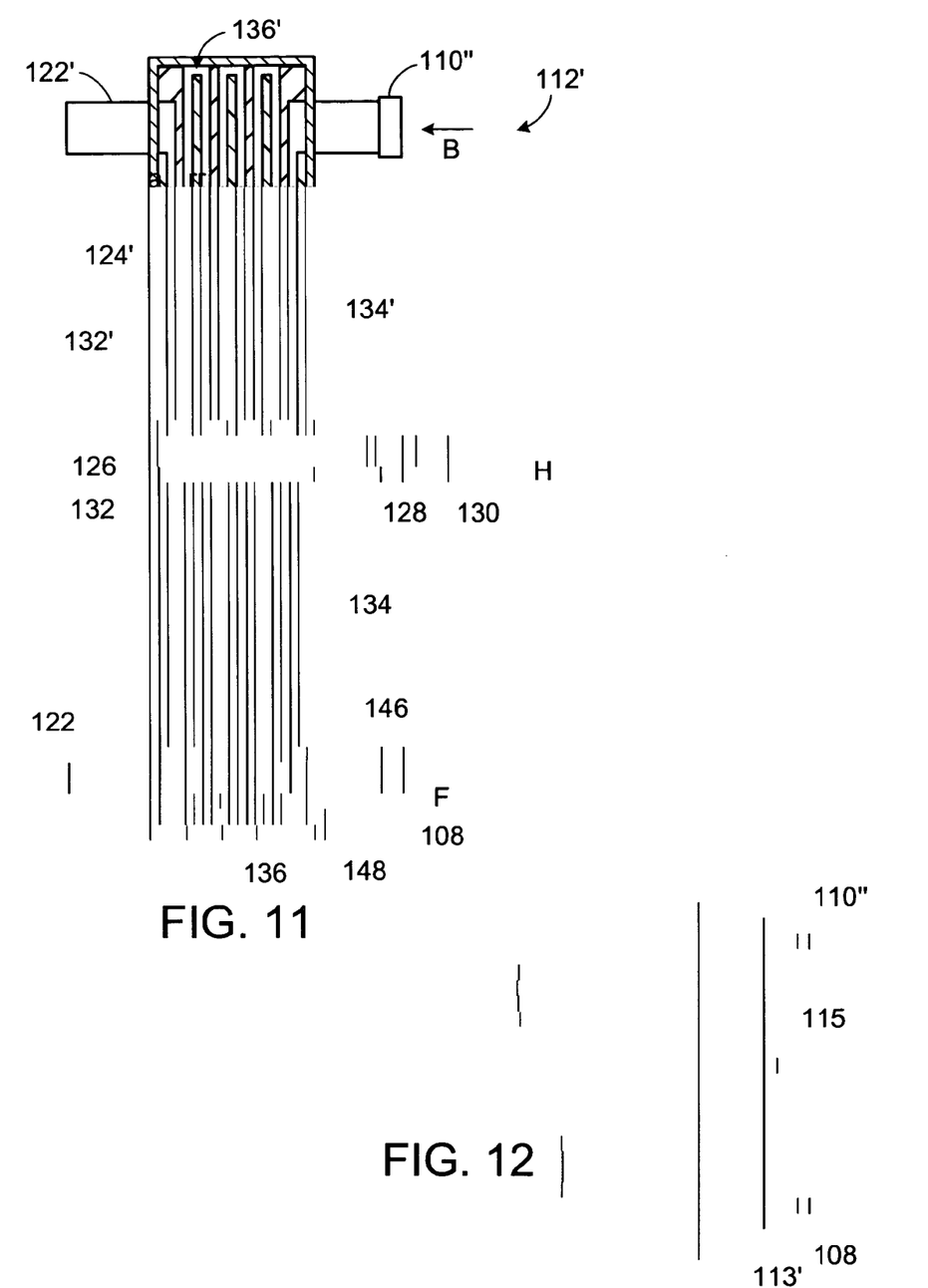
FIG. 11 is a plan, partial section view of a heat exchanger in accordance with an embodiment of a present invention.
FIG. 12 is a partial plan view of a fuel cartridge in accordance with an embodiment of a present invention.

There may be instances where it is desirable to add heat to the byproduct B as it enters the byproduct storage area 106. For example, heat may be used to prevent the byproduct from freezing, especially in the vicinity of the inlet, which would prevent additional byproduct from entering the storage area 106. Turning to FIG. 11, the exemplary heater 112' illustrated therein is configured to heat both outgoing fuel F and incoming byproduct B. The heater 112' is substantially similar to the heater 112 and similar elements are represented similar reference numerals. Here, however, the housing 124' is larger and two sets of heat transfer fins 132 and 132' are connected to heat pipe 126. The heat transfer fins 132 are on the fuel heating side and the heat transfer fins 132' are on the byproduct heating side, which is isolated from the fuel heating side. Additionally, the inner surface of the housing 124', the heat transfer fins 132 and 132', and two sets of walls 134 and 134' are used to define the fuel and byproduct paths 136 and 136'. Heat pipe portion 128 may be brought into thermal contact with a corresponding heat pipe 130 that extends from the associated fuel cell.

As noted above with reference to FIG. 4, fuel F from the fuel storage area 104 is heated by the heat pipe 126 and fins 132 as the fuel travels through the fuel path 136 on its way to the connector 108. Similarly, byproduct B will be heated by the heat pipe 126 and fins 132' as it travels from the connector 110", through the byproduct path 136', to the inlet tube 122'.

It should also be noted that cartridges in accordance with the present inventions may be configured such that the fuel and byproduct are heated by separate heaters, only the byproduct is heated, and/or a resistive heater or other type of heater is used to heat the byproduct. To that end, an exemplary fuel cartridge with a resistive heater 113' that is used to heat fuel as it exits the cartridge and byproduct as it enters the cartridge, is illustrated in FIG. 12.

Although the present inventions have been described in terms of the embodiments above, numerous modifications and/or additions to the above-described embodiments would be readily apparent to one skilled in the art. By way of example, but not limitation, the various components of the exemplary fuel cartridges described above may be interchanged. It is intended that the scope of the present inventions extend to all such modifications and/or additions.

We claim:

1. A fuel storage device, comprising:
    a fuel storage area;
    a fuel outlet;
    a fuel heater having an inlet operably connected to the fuel storage area and an outlet operably connected to the fuel outlet;
    a byproduct storage area;
    a byproduct inlet operably connected to the byproduct storage area; and
    a byproduct heater having an inlet operably connected to the byproduct inlet and an outlet operably connected to the byproduct storage area.

2. A fuel storage device, comprising:
    a fuel outlet;
    means for storing fuel;
    means for receiving energy from an outside source and transferring heat to the fuel as the fuel flows from the means for storing fuel to the fuel outlet; and
    means for storing byproduct.

3. A fuel storage device as claimed in claim 2, further comprising: a byproduct inlet operably connected to the means for storing byproduct.

4. A fuel storage device as claimed in claim 3, further comprising:
    means for receiving energy from an outside source and transferring heat to the byproduct as the byproduct flows from the byproduct inlet to the means for storing byproduct.

5. A fuel storage device for use with fuel cell that generates heat, the fuel storage device comprising:
    a fuel storage area:
    a fuel outlet:
    a fuel heater having an inlet operably connected to the fuel storage area. an outlet operably connected to the fuel outlet, and means for transferring heat from the fuel cell to fuel; and
    a byproduct storage area that is isolated from the fuel storage area.

6. A fuel storage device as claimed in claim 5, further comprising:
    a housing;
    wherein the fuel storage area is defined by a first flexible container located within the housing and the byproduct storage area is defined by a second flexible container located within the housing.

7. A fuel storage device, comprising:
    a fuel storage area:
    a fuel outlet: and
    a fuel heater having an inlet operably connected to the fuel storage area. an outlet operably connected to the fuel outlet, non-hollow heat pipe. and a plurality of heat transfer fins extending from the heat pipe;
    wherein
    the fuel heater includes a housing and a plurality of walls within the housing;
    the heat pipe and heat transfer fins are located within the housing such that the walls are located between respective pairs of heat transfer fins; and
    there are gaps between the walls and the heat transfer fins that together define a fuel path that extends from the inlet to the outlet.

8. A fuel storage device, comprising:
a fuel storage area;
a fuel outlet;
a fuel heater having an inlet operably connected to the fuel storage area, an outlet operably connected to the fuel outlet, non-hollow heat pipe and a plurality of heat transfer fins extending from the heat pipe; and
a byproduct storage area that is isolated from the fuel storage area.

9. A fuel storage device, comprising:
a fuel storage area;
a fuel outlet;
a fuel heater having an inlet operably connected to the fuel storage area, an outlet operably connected to the fuel outlet, non-hollow heat pipe, and a plurality of heat transfer fins extend from the heat pipe; and
a housing;
wherein the fuel storage area is defined by a first flexible container located within the housing and the byproduct storage area is defined by a second flexible container located within the housing.

* * * * *

UNITED STATES PATENT AND TRADEMARK OFFICE
CERTIFICATE OF CORRECTION

PATENT NO. : 7,489,859 B2
APPLICATION NO. : 10/683150
DATED : February 10, 2009
INVENTOR(S) : John A deVos et al.

Page 1 of 1

Figure 2:
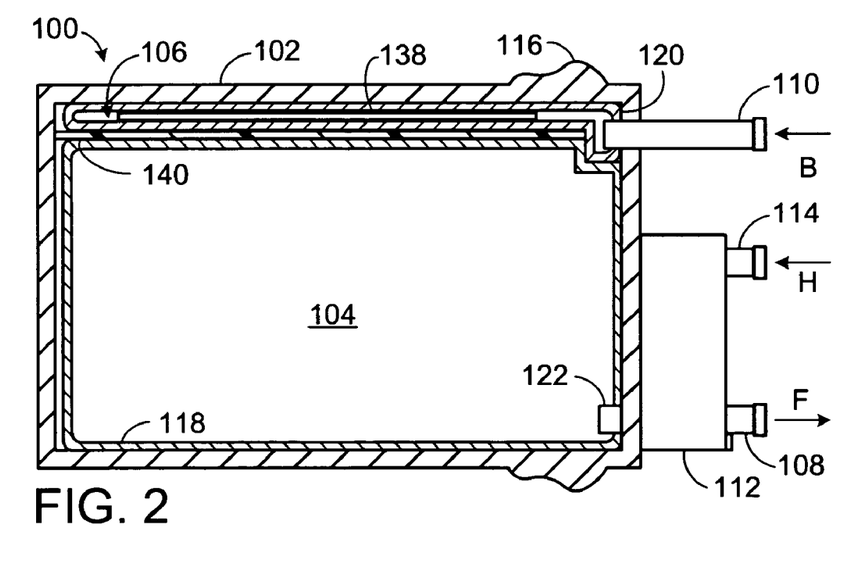
FIG. 2 is a plan, partial section view of the fuel cartridge illustrated in FIG. 1 with a full fuel storage area.
Figure 3:
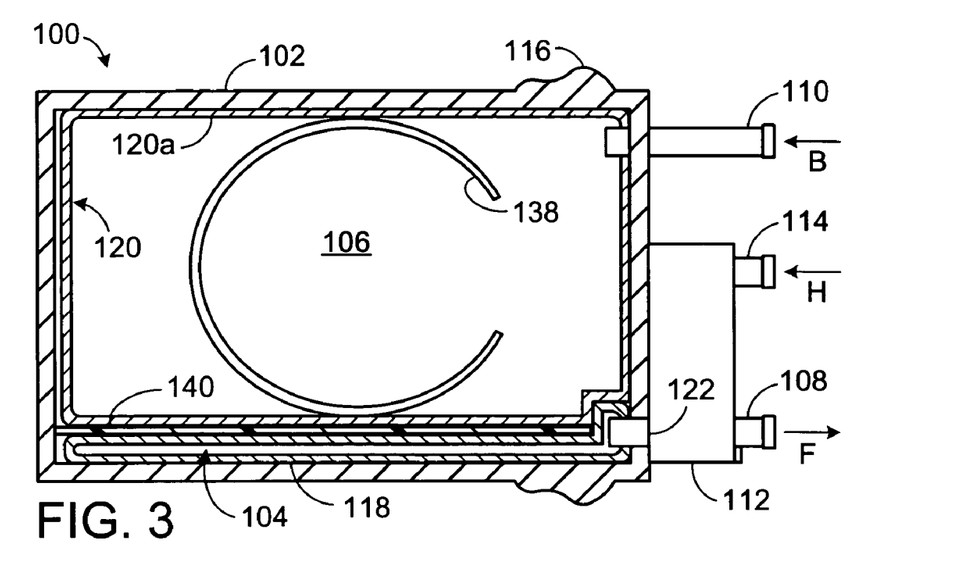
FIG. 3 is a plan, partial section view of the fuel cartridge illustrated in FIG. 1 with an empty fuel storage area.

It is certified that error appears in the above-identified patent and that said Letters Patent is hereby corrected as shown below:

In column 9, line 21, delete "FIG. 24" and insert -- FIGS. 2-4 --, therefor.

In column 10, line 37, in Claim 5, after "area" delete ":" and insert -- ; --, therefor.

In column 10, line 38, in Claim 5, after "outlet" delete ":" and insert -- ; --, therefor.

In column 10, line 40, in Claim 5, after "area" delete "." and insert -- , --, therefor.

In column 10, line 53, in Claim 7, after "area" delete ":" and insert -- ; --, therefor.

In column 10, line 54, in Claim 7, after "outlet" delete ":" and insert -- ; --, therefor.

In column 10, line 56, in Claim 7, after "area" delete "." and insert -- , --, therefor.

In column 10, line 57, in Claim 7, after "pipe" delete "." and insert -- , --, therefor.

In column 11, line 6, in Claim 8, after "pipe" insert -- , --.

In column 12, line 5, in Claim 9, delete "extend" and insert -- extending --, therefor.

Signed and Sealed this

Second Day of June, 2009

JOHN DOLL
*Acting Director of the United States Patent and Trademark Office*